Aug. 1, 1939.   C. E. POWELL ET AL   2,168,238
RAKE CLEANING DEVICE
Filed Feb. 21, 1938
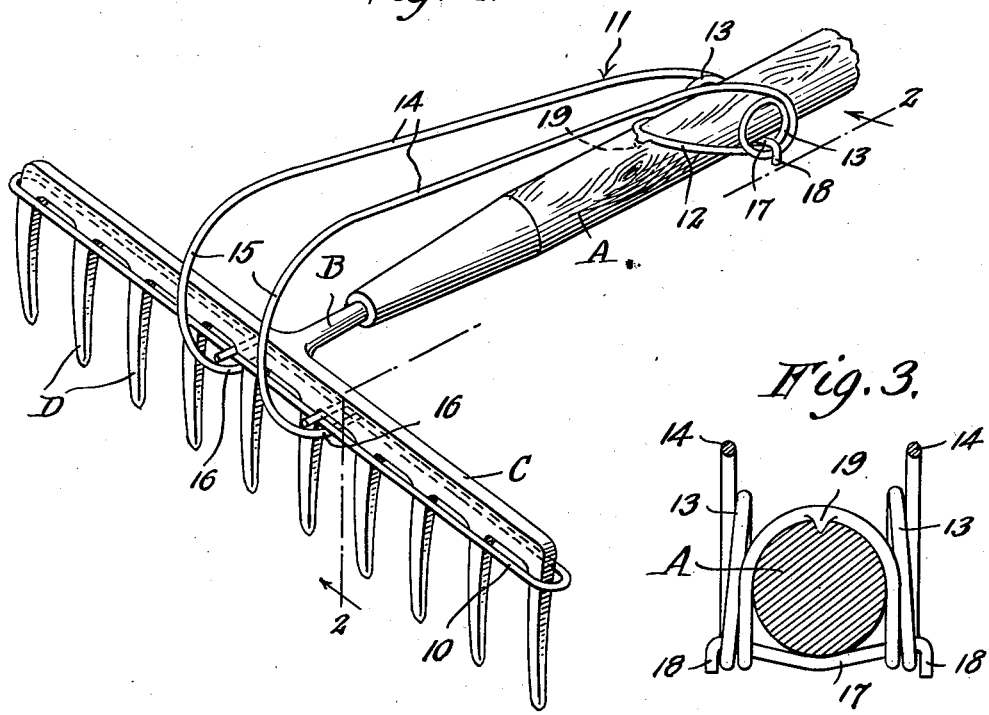
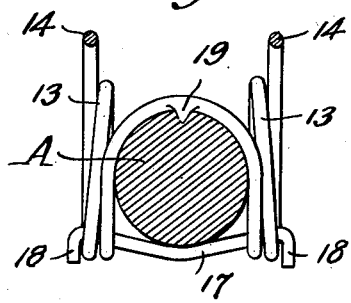
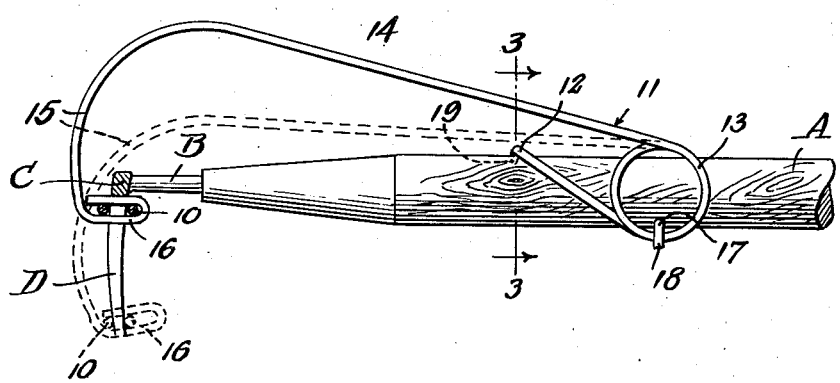
INVENTORS
Charles E. Powell
Chester F. Wood
BY
Clark r Ott
ATTORNEYS Patented Aug. 1, 1939

2,168,238

UNITED STATES PATENT OFFICE 2,168,238

RAKE CLEANING DEVICE

Charles E. Powell and Chester F. Wood,
Stony Brook, N. Y.

Application February 21, 1938, Serial No. 191,584

1 Claim. (Cl. 55—146)

This invention relates to hand rakes and comprehends an attachment therefor which provides an improved means for facilitating the dislodgeing of leaves, grass, twigs, pieces of paper or other foreign matter from the teeth of the rake which tend to clog the same and interfere with the proper functioning thereof.

The invention broadly aims to provide a cleaner for hand rakes which includes a stripper element movable with reference to the length of the teeth from the inner ends thereof to the outer free ends so as to effect the displacement of foreign matter which tends to clog the teeth.

More particularly the invention resides in an improved means for associating the stripper element with the rake so as to normally maintain said stripper element in a retracted position adjacent the inner ends of the teeth and to tension the movement of the stripper element from said normal position towards the free outer ends of the teeth.

The invention also contemplates an improved rake cleaning device which embodies a relatively few parts preferably constructed of resilient wire so that the same is capable of economic production and the construction of which device is such that it may be readily associated with practically any of the standard types of hand rakes or removed therefrom without necessitating any alterations in the rake structure and without requiring the use of tools.

With the above enumerated and other objects in view, reference is now made to the following specification and the accompanying drawing in which there is disclosed a single preferred embodiment, by way of illustration, while the appended claim covers variations and modifications which fall within the scope of the invention.

In the drawing:

Fig. 1 is a perspective view of a rake equipped with a cleaning attachment constructed in accordance with the invention and showing the stripping element in its normal retracted position.

Fig. 2 is a sectional view taken approximately on the line 2—2 of Fig. 1, illustrating respectively in full and broken lines the normal retracted and the extended positions of the stripper element.

Fig. 3 is an enlarged transverse sectional view taken approximately on the line 3—3 of Fig. 2.

Referring to the drawing by characters of reference, A designates the rake handle, B the shank of the rake head, which head also includes a tooth supporting bar C and the depending rake teeth D.

The cleaning device or attachment consists of a stripper element 10 which is fashioned from a length of wire to provide an endless elongated loop of the proper length and width to transversely embrace the tooth portion of the rake head, while free to slide with reference to the length of the teeth from the inner or upper ends thereof at the juncture of the same with the tooth bar C to the lower or outer free ends of the teeth. This movement operates to dislodge or strip foreign matter, such as leaves, twigs, grass, paper or the like which are impaled on the teeth or are wedged between the same when the rake is in use.

The device or attachment further includes a member designated generally by the reference character 11 which serves as a means for associating the stripper element with the rake, acts to normally maintain the stripper element 10 in a retracted position adjacent the inner end of the teeth as shown in Fig. 1 and in full lines in Fig. 2, while further operating to tension the movement of the stripper element from the normal position to the free outer end of the teeth as illustrated in broken lines in Fig. 2.

The member 11 is also preferably fashioned from a single or continuous length of resilient wire which is bent upon itself to provide a medial U-shaped bight portion 12 adapted to engage over and embrace the rake handle A on the peripheral portion thereof disposed opposite to that from which the rake teeth D depend. The member 11 is provided adjacent the bight portion with coiled portions 13 spaced apart and adapted to be disposed on opposite sides of the rake handle and constituting a continuation of the leg elements of the bight portion 12. A pair of arms 14 are provided which arms respectively extend from and form a continuation of each coiled portion 13. The arms 14 are directed towards the head of the rake and are substantially parallel to each other with the free ends 15 curved downwardly and provided with rearwardly directed loop terminals 16 which embrace the stripper element at longitudinally spaced regions which lie on opposite sides of a line in prolongation of the handle. When in applied position, the loop terminals 16 extend between adjacent rake teeth and underlie the tooth bar C of the rake head, the terminal loops 16 being of sufficient length to permit of a play or lost motion to compensate for the arcuate path of movement of the stripper element.

The member 11 is retained in place on the rake handle A by means of a clip 17 which extends transversely of and on the underside of the rake handle opposite to the side of the handle on which the bight portion 12 is disposed, with the opposite ends of said clip extending through the coiled portions 13 and provided with angularly disposed depending terminals 18. While ordinarily the clamping action set up between the bight portion 12 and the clip 17 due to the resiliency of the wire is sufficient to secure the element 11 in position on the rake handle, in some instances it may be found advisable to provide the bight portion 12 with an anchoring spur 19 which is driven into the handle as illustrated.

In applying the device to the rake, the stripper element 10 is first inserted in the loop terminals 16 and the loop is then slid upwardly over the rake teeth so that the loop terminals are disposed respectively between adjacent pairs of rake teeth D. The bight portion 12 of the member 11 is then swung downwardly under tension until it engages over the rake handle with the coiled portions 13 disposed on opposite sides thereof, after which the clip 17 is emplaced.

When the anchoring spur 19 is used the same is driven into the rake handle and the device is ready for use. When in use, if it is desired to free the rake teeth of foreign matter impaled thereon or wedged between the same, the user has only to swing the arms 14 downwardly to effect the movement of the stripper element 10 longitudinally of the rake teeth D from the inner ends to the free ends. The device may be detached from the rake by first removing the clip 17 and reversing the operation of applying the same as previously described.

What is claimed is:

In a tooth cleaning attachment for hand rakes having a stripper element adapted to transversely embrace the tooth portion of the rake head and to slide with reference to the length of the teeth, a member for associating said stripper element with the rake so as to normally maintain the stripper element in a retracted position adjacent the inner ends of the teeth and to tension the movement of the same towards the free outer ends of the teeth, said member consisting of a continuous length of resilient wire having a medial bight portion overlying the rake handle, a pair of coiled spring portions each attached at the lower end to one of the opposite ends of the bight portion and located on opposite sides of the rake handle, an arm extending from the remaining upper end of each coiled spring portion towards the rake head, a depending looped terminal at the free end of each arm surrounding the stripper element at longitudinally spaced regions thereof and lying on opposite sides of the axis of the handle, and a cross clip engaging through the coiled portions of said member and contacting with the handle on the underside thereof so as to dispose and retain the coiled springs under tension to thereby resiliently impinge the bight portion against the upper side of the rake handle, said cross clip having terminals engaging respectively with said coiled springs to retain said cross clip in place.

CHARLES E. POWELL.
CHESTER F. WOOD.